United States Patent [19]

Alexander et al.

[11] Patent Number: 5,186,516
[45] Date of Patent: Feb. 16, 1993

[54] POWER LATCH SYSTEM

[75] Inventors: Michael P. Alexander, Grosse Ile; Allan J. Adams; Stephen P. Tokarz, both of Lincoln Park, all of Mich.

[73] Assignee: ASC Incorporated, Southgate, Mich.

[21] Appl. No.: 737,915

[22] Filed: Jul. 29, 1991

Related U.S. Application Data

[63] Continuation of Ser. No. 385,495, Jul. 26, 1989, abandoned, which is a continuation-in-part of Ser. No. 231,522, Aug. 12, 1988, abandoned, and a continuation-in-part of Ser. No. 356,249, May 24, 1989, abandoned, said Ser. No. 231,522, is a continuation-in-part of Ser. No. 100,529, Sep. 24, 1987, Pat. No. 4,819,983.

[51] Int. Cl.$^5$ .............................. B60J 7/185
[52] U.S. Cl. .................... 296/121; 292/DIG. 5; 292/DIG. 43; 292/251; 292/252; 292/341.15; 292/341.16; 411/348; 411/433
[58] Field of Search ............... 385/495; 296/120.1, 296/121, 76; 292/DIG. 5, DIG. 43, 251, 252, 341.15, 341.16; 411/433, 21, 348

[56] References Cited

U.S. PATENT DOCUMENTS

| | | | |
|---|---|---|---|
| 2,741,503 | 4/1956 | Thompson, III | 292/251 |
| 2,753,202 | 7/1956 | Smith et al. | 292/251 |
| 3,081,078 | 3/1963 | Lohr | 292/251 |
| 4,643,472 | 2/1987 | Schukei et al. | 411/348 X |
| 4,819,983 | 4/1989 | Alexander | 296/121 |

FOREIGN PATENT DOCUMENTS

| | | | |
|---|---|---|---|
| 1429628 | 5/1969 | Fed. Rep. of Germany | 411/433 |
| 2608664 | 6/1988 | France | 292/251 |
| 30852 | 10/1970 | Japan | 411/433 |

Primary Examiner—Dennis H. Pedder
Attorney, Agent, or Firm—Harness, Dickey & Pierce

[57] ABSTRACT

A power latching mechanism for use on automobile closures is disclosed, comprising a pin member, a keeper member having a hollow cylindrical body which receives the pin member, a motor for urging engagement between the pin member and the keeper member, and a spring and associated hardware for selectively retaining the pin member in the keeper member. In one embodiment, the keeper member retentively engages the pin member when the pin member is manually inserted thereinto and is also manually disengagable.

7 Claims, 8 Drawing Sheets

POWER LATCH SYSTEM

CROSS-REFERENCE TO RELATED APPLICATION

This application is a continuation of co-pending U.S. patent application Ser. No. 385,495 filed Jul. 26, 1989, now abandoned which is a continuation-in-part of co-pending U.S. patent application Ser. No. 07/231,522, filed Aug. 12, 1988, now abandoned for "Power Latch System", the disclosure of which is hereby incorporated by reference, and is a continuation-in-part application of U.S. patent application Ser. No. 07/356,249, filed May 24, 1989, now abandoned, the disclosure of which is hereby incorporated by reference. Patent application Ser. No. 231,522 was a continuation-in-part of U.S. patent application Ser. No. 07/100,529 which was filed Sep. 24, 1987, and has now issued as U.S. Pat. No. 4,819,983. The disclosure of U.S. Pat. No. 4,819,983 is also hereby incorporated by reference.

BACKGROUND OF THE INVENTION

1. Field of the Invention

The present invention concerns automotive latching systems. More particularly, the present invention concerns powered latching systems. Even more particularly, the present invention concerns powered latching systems for convertible tops, trunk lids, tonneau covers and the like.

2. Prior Art

Heretofore, there have been proposed, powered latch systems for convertible tops and the like for use in automotive applications. However, in prior art systems there was a tendency for the latching pins to be cross-threaded, to bind up for and to otherwise render such power systems unusable necessitating expensive repair. Furthermore, such prior art systems had no ability to catch on the latch without first energizing the motor.

Moreover, such prior art systems required alignment of the pin with the latching mechanism to relatively close precision, lest the system be rendered inoperative. In addition, if the power supply failed in such prior art systems, it was virtually impossible to manually latch the convertible top to the automotive body, or to manually disengage the convertible top therefrom.

It is to be appreciated that in modern automotive technology, and with the increasing popularity of convertible tops, that such prior art systems have deficiencies which render such convertible automobiles less than optimally desirable.

In the present day market, both male and female purchasers are attracted to the acquisition of such vehicles. Without a powered latch system which overcomes the problems encountered in the prior art the attractiveness of such vehicles, especially to the female purchaser, is somewhat detracted.

In U.S. Pat. No. 4,819,983, issued to Alexander et al. there is disclosed a power latch system which overcomes many of the deficiencies in the prior art. Yet, the prior power latch system of Alexander et al. has certain inherent drawbacks. The mechanism thereof is complex in that it requires spring-loaded clogs and various housings. Thus, it would be advantageous to simplify the construction of the power latch system disclosed by the Alexander patent.

As will subsequently be detailed, the present invention provides a power latching system which overcomes the deficiencies in the prior art.

SUMMARY OF THE INVENTION

The present invention provides a power latching mechanism comprising:

(a) a pin member;

(b) a keeper member having a body with a cylindrical passageway formed therein for receiving the pin member, the passageway having a substantially circular inner periphery in cross section;

(c) means for rotatably urging engagement between the pin member and the keeper member by rotating one of the members;

(d) means for selectively retaining the pin member in the keeper member; and (e) means for retentively engaging the pin member in the keeper member when the pin member is manually inserted into the keeper member without rotation of either member.

In one embodiment, manually operable means for disengaging the pin member from the keeper member is provided.

For a more complete understanding of the present invention, reference should be made to the following detailed description read in conjunction with the accompanying drawings. Throughout the following description and in the drawings, identical reference numbers are used to refer to the same component shown in multiple figures of the drawings, in which:

DETAILED DESCRIPTION OF THE PREFERRED EMBODIMENT

At the outset, it is to be noted that although the present invention will be described with reference to a convertible top for a vehicle, the present invention evidences other utility wherever a powered pull down latching arrangement is desired. For example, in an automobile environment, in addition to latching convertible tops, the present invention is useful in latching powered T-tops, deck lids and the like. Likewise, the latching assembly hereof can be used to tie down the rearwardmost bow in a convertible-type vehicle.

Figure 1:
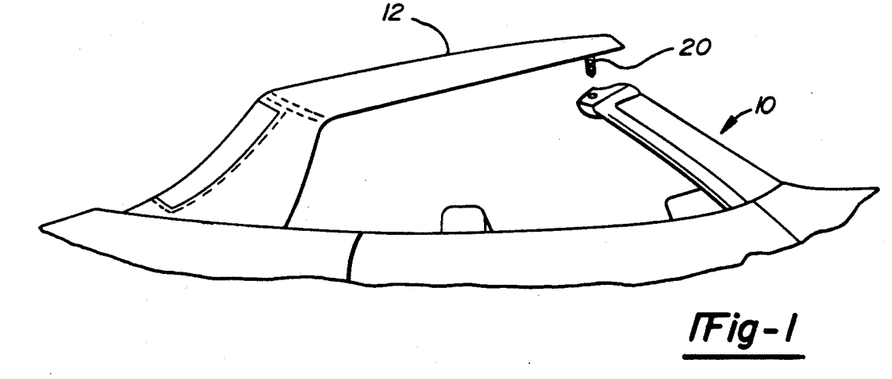
FIG. 1 is a partial, side elevational view of a convertible-type vehicle incorporating the power latch system hereof.
Figure 2:
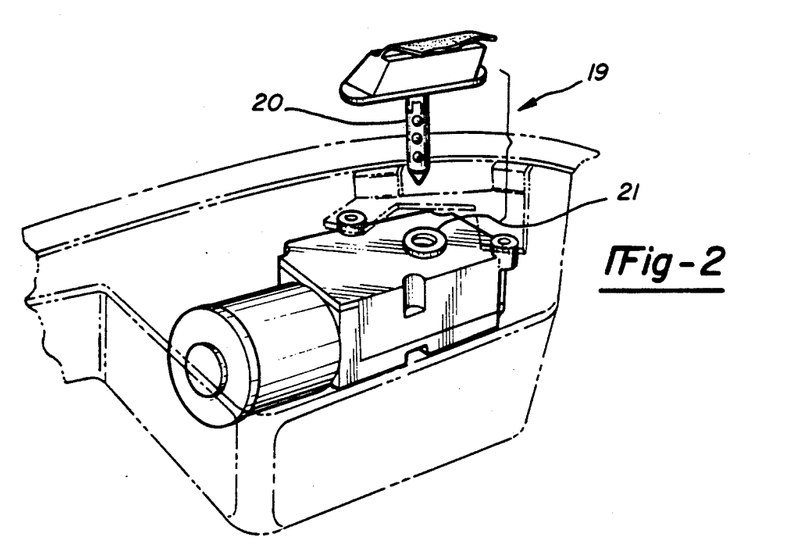
FIG. 2 is a perspective view of a first embodiment of the power latch system hereof.

Referring now to the drawing, and in particular, FIG. 1, there is depicted therein an automobile 10 having a convertible or foldable top 12. As is known to those skilled in the art to which the present invention pertains, such convertible or foldable tops, generally, comprise a fabric covering secured to a plurality of bows or struts which traverse the width of the vehicle and are foldable rearwardly and forwardly through a plurality of linkages which interconnect the various bows or struts which carry the fabric. The actual construction of the convertible top and the linkage system for the folding and unfolding thereof does not form part of the present invention, per se.

Figures 3, 5:
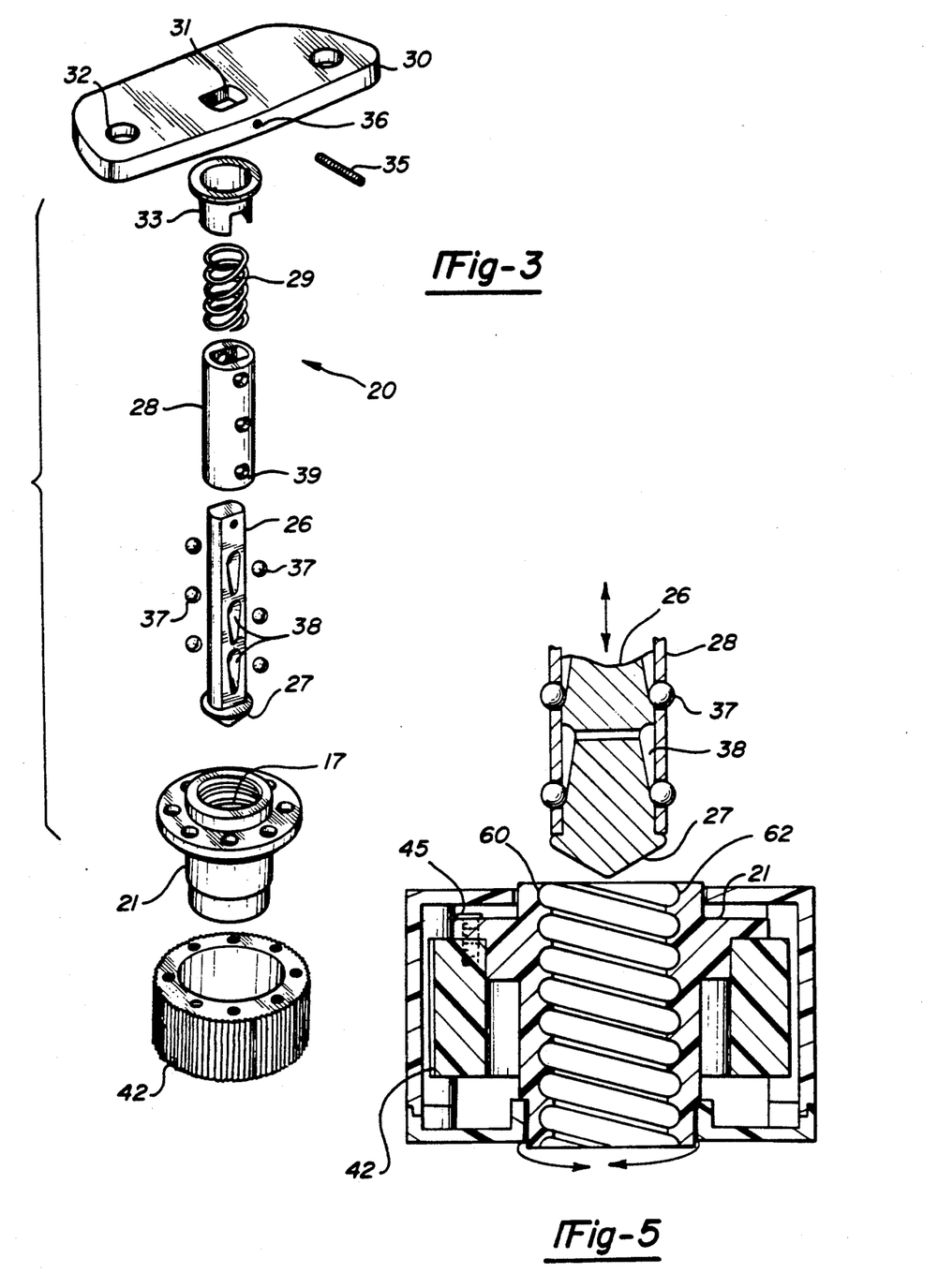
FIG. 3 is an exploded perspective view of selected portions of the latching assembly of FIG. 2.
FIG. 5 is a cross-sectional view taken along line 5—5 of FIG. 4.
Figure 4:
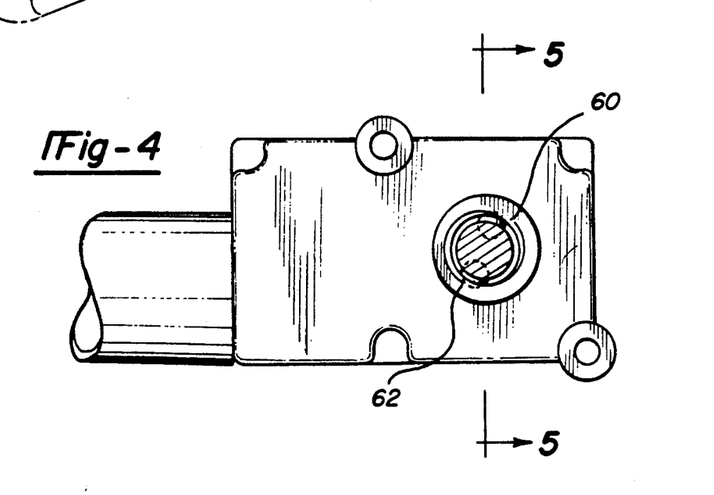
FIG. 4 is a top plan view, partly in section, of the latching assembly FIG. 2.

Referring to FIGS. 1–8, a first embodiment of a power latch mechanism in accordance with the present invention, shown generally at 19, comprises a pin member 20, and also a keeper member 21 comprising a hollow cylindrical body which receives the pin member 20. The keeper member 21 has a cylindrical passageway 17 formed therein and the passageway 17 has a substantially circular inner periphery in cross section as shown in FIG. 4. Referring in particular to FIGS. 4–8, it may be seen that the keeper member 21 has two thread windings 60, 62 therein which are disposed oppositely across from one another at any given height.

Figures 9, 10:
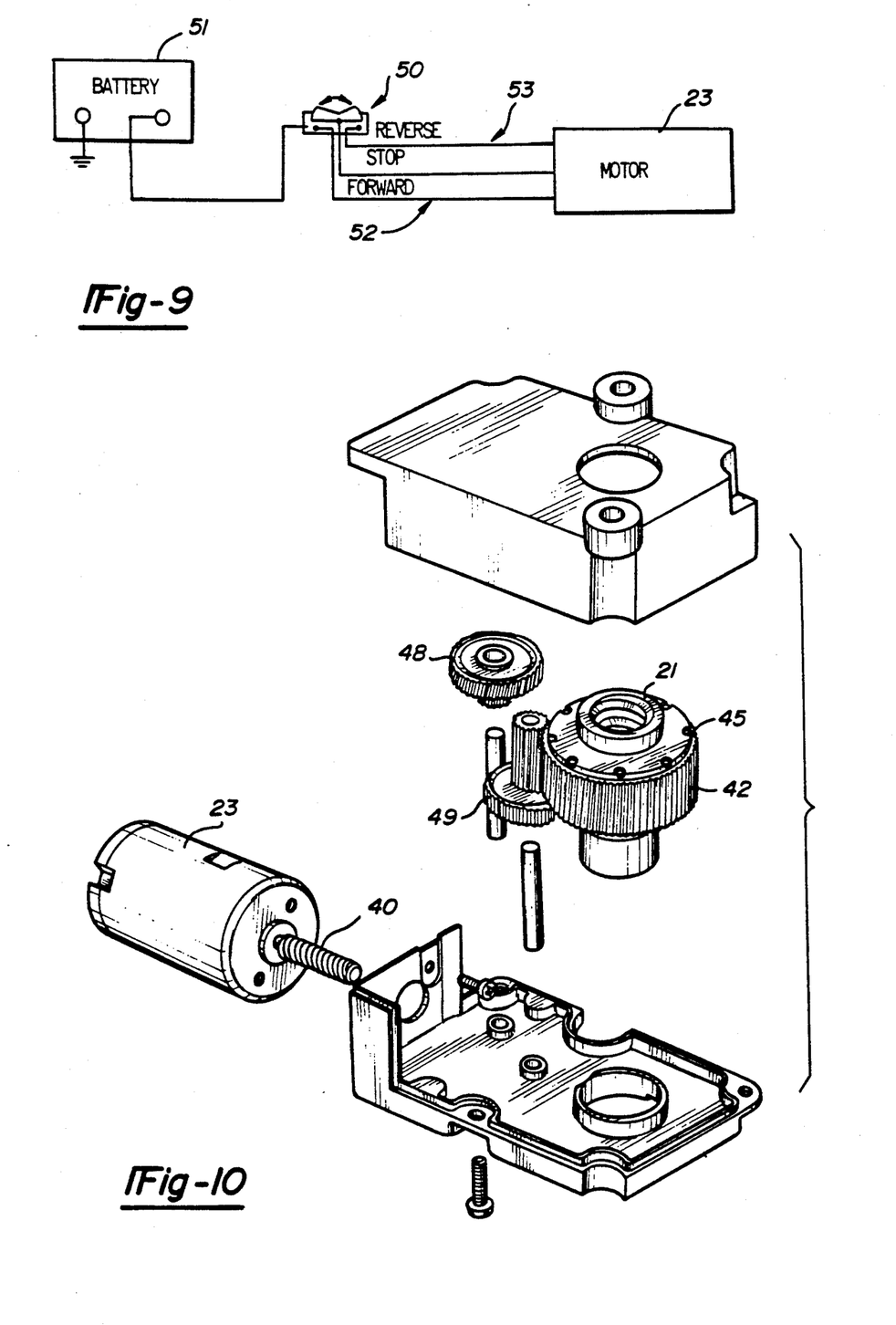
FIG. 9 is a schematic diagram of a possible circuit to power the latch assembly of the present invention.
FIG. 10 is an exploded perspective view of the motor and drive assembly of the embodiment of FIG. 2.

The mechanism 19 of the present invention includes means, such as e.g., an electric motor 23 acting together with gears, for rotatably urging engagement between the pin member 20 and the keeper member 21, as shown in FIG. 10, and as will be described in further detail herein. The electric motor 23 turns a worm gear 40 which is affixed to the shaft thereof, to turn drive gears 48, 49 which in turn operate the driven gear 42 which is attached by screws 45 to the keeper member 21, thereby threadedly engaging the pin member 20 and keeper member 21 when the keeper member 21 is rotated in a first direction. When multiple gears having different diameters such as 42, 48, and 49 are used, this increases the torque applied to the keeper member over what it would be using only a single gear, due to the differing gear diameters.

If the polarity to the motor 23 is reversed by the operation of the switch 50, the motor 23 will rotate the keeper member 21 in a second direction to disengage the pin member 20 therefrom. In one embodiment (not shown), the worm gear 40 may turn the driven gear 42 directly.

Referring in particular to FIG. 3, the pin member 20 comprises a base portion 30 for mounting the pin member 20 to a convertible top 12 or other vehicle surface using suitable fasteners (not shown) in mounting holes 32. The pin member 20 further comprises a shank portion 26 which attaches to the base portion 30 and depends therefrom, the shank portion 26 having an enlarged end 27 opposite the base portion 30. The shank portion 26 is attached to the base portion 30 by any suitable means, such as e.g. by forming an asymmetrical hold 31 in the base portion 30, the hole 31 corresponding to the shape of the shank portion 26 so as to receive it therein. An allen screw 35 or other threaded fastener threadably engages with a threaded hole 36 which communicates with the asymmetrical hole 31. The allen screw or similar fastener is tightened in the threaded hole 36 until it abuts tightly against the shank portion 26 to hold it in place.

The pin member 20 also comprises a retaining sleeve 28 which surrounds the shank portion 26, biasing means such as a coil spring 29 or the like to force the retaining sleeve 28 downwardly on the shank portion 26, and may include, but does not require, a collar such as that shown at 33 in order to cover and protect the spring 29.

A plurality of engaging members 37 fit into trough-shaped recesses 38 in the sides of the shank portion 26, one engaging member 37 for each recess 38, and the engaging members 37 are held therein by the retaining sleeve 28 which fits over the shank portion 26. The engaging members 37 fit in apertures 39 which are formed in the sides of the sleeve 28, and the engaging members 37 are too large to pass completely through the apertures 39, which correspond in number and location to the recesses 38 and are sized slightly smaller than the engaging members 37 to prevent the engaging members 37 from passing therethrough. The apertures 39 are chamfered to provide a close fit for the engaging members 37 therein. The recesses 38 are shallow at their ends toward the enlarged end 27 and reach a maximum depth at their ends toward the base portion 30. This maximum depth is slightly less than the height of one engaging member 37. The recesses 38 are oriented parallel to the longitudinal axis of the shank portion 26. In the illustrated embodiment of FIGS. 4–8, the engaging members are located horizontally opposite one another at approximately the same height on the shank portion 26.

In normal use, the spring 29 acts as a means for biasing the retaining sleeve 28 against the enlarged end 27 of the shank portion 26 which acts as a stop to retain the sleeve 28 on the shank portion 26. The sleeve, thus biased, keeps the engaging members 37 in the shallow ends of the recesses 38, to force the engaging members 37 outwardly, thus, either retaining the engaging members 37 in the threads 22 inside the keeper member 21 to prevent disengagement of the pin member 20 from the keeper member 21, or allowing for threadable engagement between the pin member 20 and the keeper member 21 when the switch 50 activates the means for rotating in a first direction when the members 20, 21 are initially being rotatably and threadably engaged.

Figure 6:
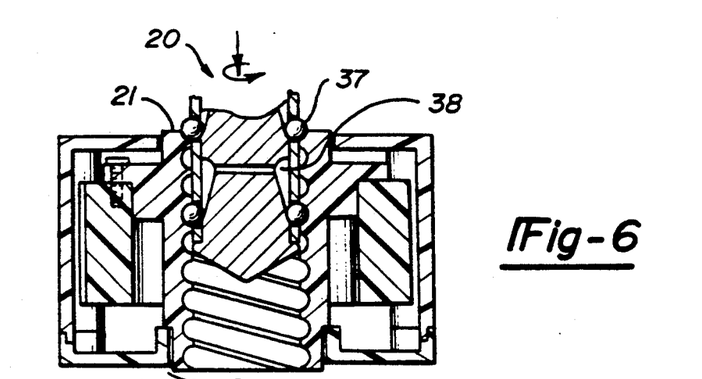
FIG. 6 is a cross-sectional view of the latching assembly of FIG. 2 during power engagement according to the present invention.

During rotation of the keeper member 21, the two engaging members 37 which are closest to the enlarged end 27 of the shank portion are simultaneously engaged in opposite thread windings 60, 62 inside the keeper member 21 as shown in FIG. 6. As the keeper member 21 continues to rotate, the thread windings 60, 62 exert downward pressure on the engaging members 37 to draw the shank portion 26 into the keeper member 21 as shown by the arrows in FIG. 6. The location of the engaging members 37 is arranged and dimensioned so that the engaging members fit engagingly into the opposite thread windings 60, 62 inside the keeper member 21 and act as male threads on the exterior of the pin member 20. The location and the arrangement of the engaging members 37 on the shank portion 26 may be varied by design, according to the needs of a particular application, so long as the engaging members 37 fit within the threads 60, 62 formed in the walls of the passageway 17 inside the keeper member 21 to ensure engagement of the pin member 20 in the keeper member 21. The cooperation between the threads 60, 62 of the keeper member 21 and the engaging members 37 provides a means for selectively retaining the pin member 20 in the keeper member 21.

The engaging members 37 may be vertically spaced on the shank portion 26 at a convenient distance which allows sufficient space therebetween for the trough-shaped recesses 38. The spacing of the engaging members 37 on the shank portion 26 must be dimensioned to allow alignment of the engaging members 37 with threads 60, 62 of the keeper member when the pin member 20 advances sufficiently into the keeper member to bring each successive pair of engaging members 37 into proximity with the threads 60, 62 of the keeper member 21.

Figure 7:
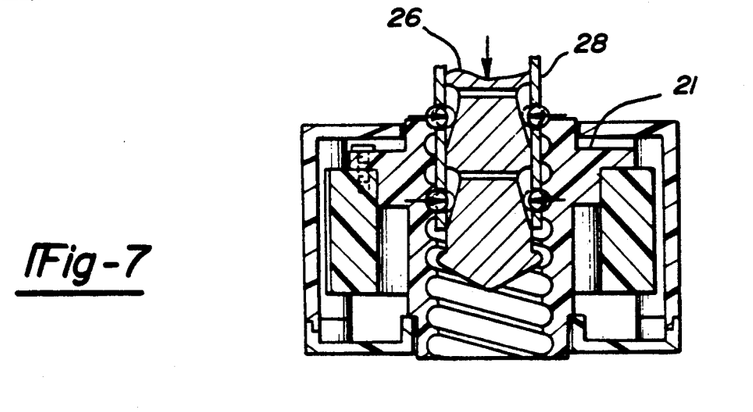
FIGS. 7 and 8 are cross-sectional views of the latching assembly of FIG. 2 showing operation thereof during manual engagement.
Figure 8:
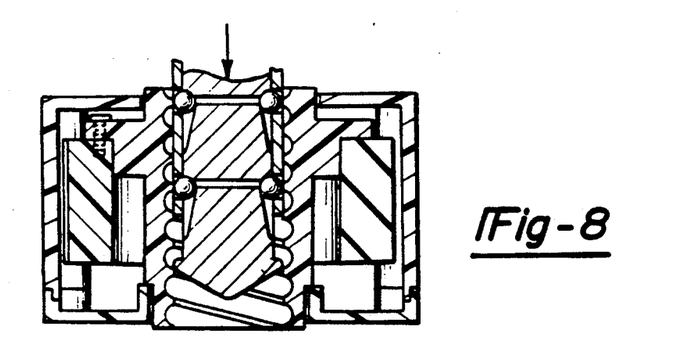

In the event of power failure, however, the pin member 20 can be manually inserted into the keeper member 21 without rotation of either member as shown in FIGS. 7 and 8. When sufficient force is applied to overcome the tension on the spring 29, the retaining sleeve 28 slides up the shank portion 26 toward the base portion 30, allowing the engaging members 37 to move deeper into the recesses 38 until they are flush with the outside of the sleeve 28 when in the deep ends of the recesses 38, thus allowing the engaging members 37 to temporarily bypass the threads 60, 62 inside the keeper member 21 as shown in FIG. 8 and allowing the pin 20 to be fully engaged with the keeper member 21.

When manual force is applied to the pin 20 in an upward direction so as to attempt to remove it from the keeper 21, that force acts in concert with the spring 29 to keep the sleeve 28 pushed against the enlarged end 27 of the shank portion, thus keeping the engaging members 37 in the shallow ends of the recesses 38, biasing the engaging members 37 outwardly, and selectively retaining the pin member 20 in the keeper member 21 to prevent manual disengagement of the first embodiment of the latching mechanism of the present invention, until the motor 23 is energized by the switch 50 to turn in a second direction to rotatably and threadedly disengage the pin 20 from the keeper 21.

In the above described fashion, the keeper member 21 retentively engages the pin member 20 when the pin member 20 is manually inserted thereinto without rotating either member.

Referring particularly to FIGS. 9 and 10, the motor 23 and gears 40, 42, 48, and 49 together constitute a means for rotating the keeper member 21 to urge engagement between it and the pin member 20. A conventional battery 51 acts as a power source for energizing the means for rotating, and a switch 50 is included in the circuit for selectively connecting the power source to the means for rotating and for determining the direction of rotation of the keeper member 21, either by closing a forward circuit 52 which polarizes the motor 23 to actuate the means for rotating in a first direction and to rotatably and threadedly engage the pin member 20 in the keeper member 21, or alternatively, by closing a reverse circuit 53 which reverses the polarity to the motor 23 to actuate the means for rotating in a second direction and to rotatably and threadedly disengage the pin member 20 from the keeper member 21.

Referring now to FIGS. 11–16 a second embodiment of the, power latch mechanism of the present invention, shown generally at 119, comprises a pin member 120, and a keeper member 121 comprising a hollow cylindrical body which receives the pin member 120 therein. The pin member 120 has threads 122 formed therearound on the exterior surface thereof.

Figure 13:
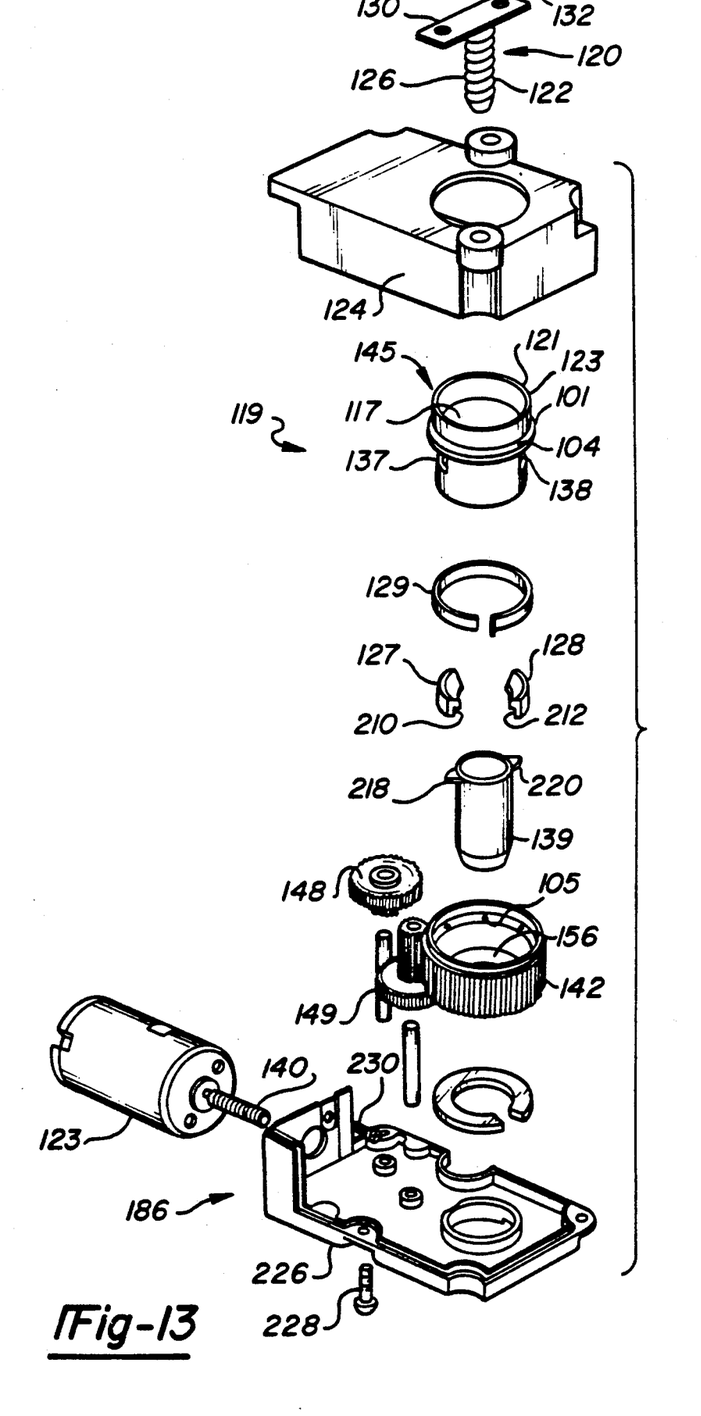
FIG. 13 is an exploded perspective view of the embodiment of FIG. 11.

The mechanism also includes means, such as e.g., an electric motor 123 acting together with gears 140, 142, 148, 149, for rotatably urging engagement between the pin member 120 and the keeper member 121 as will be described in further detail herein. The electric motor 123 turns a worm gear 140 which is attached to the shaft thereof to turn drive gears 148, 149 which in turn operate the driven gear 142 which is attached by screws 145 to the keeper member 121. The motor 123 thereby threadedly engages the pin member 120 and keeper member 121 when turned in a first direction. When multiple gears having different diameters such as 140, 142, 148, and 149 are used, this increases the torque applied to the keeper member over what it would be using only a single gear. If the polarity to the motor 123 is reversed by the operation of the switch 150, the motor 123 will rotate the keeper member 121 in a second direction to disengage the pin member 120 therefrom.

Referring in particular to FIG. 13 the pin member 120 comprises a base portion or plate 130 for mounting the pin member 120 to a convertible top 112 or other vehicle surface using suitable fasteners (not shown) in mounting holes 132 which are formed in the plate 130. The pin member 120 further comprises a cylindrical shank portion 126 which attaches to the base portion 130 and depends therefrom, the shank portion 126 having threads 122 formed therearound for engaging with a keeper member 121. The shank portion 126 may be attached to the base portion 130 by any suitable means, or may be formed integrally therewith.

The keeper member 121 comprises a hollow cylindrical body 123 with a cylindrical passageway 117 formed therein for receiving the pin member 120. The keeper member 121 has rectangular openings 137, 138 formed in opposed sides thereof. Disposed within the recesses 137, 138 are a pair of opposed pawls 127, 128 which engagingly fit into the threads 122 of the pin member 120 to selectively retain the pin member 120 in the keeper member 121 as will be further described herein.

The keeper member 121 has a circumferential flange 101 extending radially outwardly therefrom above the recesses 137, 138; and the flange 101 may have a plurality of holes 104 formed therethrough for attaching the cylindrical body 117 to the driven gear 142 by the use of threaded fasteners 145 passing through the holes 104 and vertically into threaded holes 105 formed in the driven gear 142.

Figure 12:
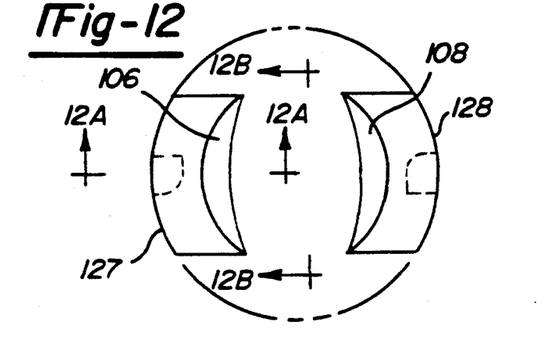
FIG. 12 is a top plan view of the pawls of the power latching mechanism of FIG. 11.
Figure 12B:
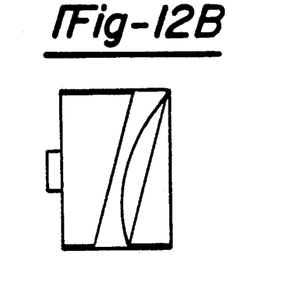
FIG. 12B is a side plan view of one of the pawls, viewed along the line 12B—12B of FIG. 12.
Figure 14A:
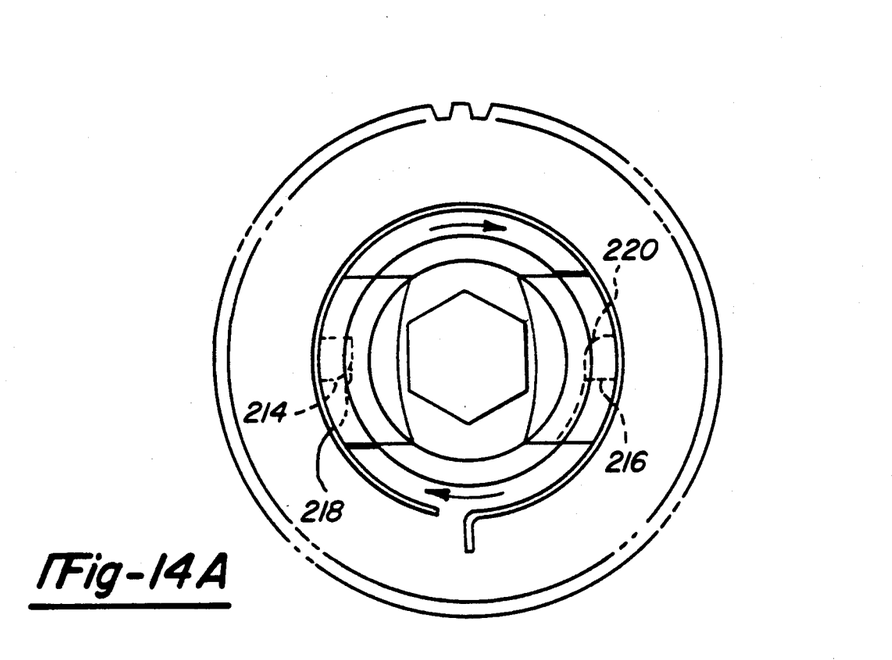
FIG. 14A is a top plan view, partly in section, of the keeper assembly of FIG. 13, parts of the assembly being shown in phantom.
Figure 14B:
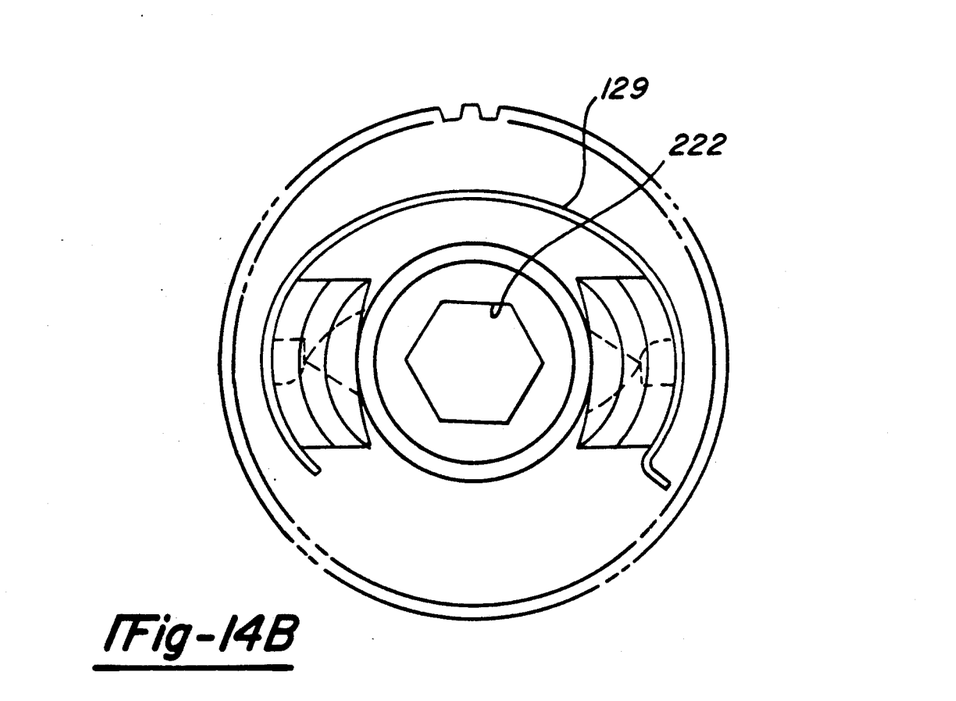
FIG. 14B is a view similar to FIG. 14A showing the relative positions of the components of the mechanism after the cam driver tube is rotated.

Referring to FIG. 12, the pawls 127, 128 are generally opposed curved bodies and have inclined ramp portions 106, 108 on the innermost surfaces thereof, the ramp portions 106, 108 being inclined at the same angle as that of the threads 122 on the pin member 120, which may be in a range of 20°-60°. The ramp portions 106, 108 have substantially flattened faces 207, 209 respectively on the lower surfaces thereof which engage the threads 122 of the pin member 120, and downwardly sloping faces 165, 167 respectively on the upper surfaces thereof to facilitate manual insertion of the pin member 120 into the keeper member 121. In one embodiment the upper faces 165, 167 of the ramp portion 106, 108 may slope downwardly at a 45° angle. The lowermost edge of the inner surface of each of the pawls has a notch 210, 212 respectively formed along the length thereof. Located within the notches 210, 212 as seen in phantom in FIGS. 14A and 14B are a pair of cam follower projections 214, 216 respectively.

The driven gear 142, has a radially inwardly projected flange 156 formed at the lower surface thereof on which rests a cam driver tube 139, which is of a generally cylindrical shape and has a pair of opposed cams 218, 220 projecting radially and transversely outwardly therefrom as seen in FIG. 13. The cams 218, 220 are disposed in the notches 210, 212 of the pawls 127, 128 as shown in phantom in FIG. 4A.

A resilient spring band 129 surrounds the cylindrical member 117 around the pawls 127, 128 just below the flange 101 and serves to bias the pawls 127, 128 inwardly. The spring band 129 cooperates with the pawls 127, 128 to selectively retain the shank portion 126 of the pin member 120 in engagement with the keeper member 121 once the two members 120, 121 are fully engaged.

Space is left inside the driven gear 142 between the spring band 129 and the inner wall of the gear 142 to allow for enough outward movement of spring band therein so the pawls 127, 128 can clear the threads 122 of the shank 126 when the cam driver tube is rotated manually to overcome the force of the spring band 129.

Formed at the bottom of the cam driver tube 139 may be a geometric recess 222 as shown in FIG. 14B. In the embodiment shown, the geometric recess 222 is a female hex fitting. An allen wrench or other suitable tool 239 may be installed into the recess 222 to manually rotate the cam driver tube 139. Rotation of the tube 139 pushes the cams 218, 220 against the cam follower projections 214, 216 to move the pawls 127, 128 radially outwardly with respect to one another to allow for disengagement of the pin member 120 from the keeper member 121.

This rotation of the cam driver tube 139 to cause outward movement of the pawls 127, 128 is illustrated in FIGS. 14A and 14B. Distortion of the spring band 129 is exaggerated in FIG. 14B for purposes of illustration.

A keeper housing 186 having an upper section 224 and a lower section 226 is provided to house the components of the keeper member 121 and the drive gears 148, 149. The upper section 224 is attached to the lower section 226 by suitable fasteners such as screws 228 of which one is illustrated. Similarly, the motor 123 may be attached to the housing 186 by suitable fasteners such as screws 230 of which one is illustrated.

Figure 15A:
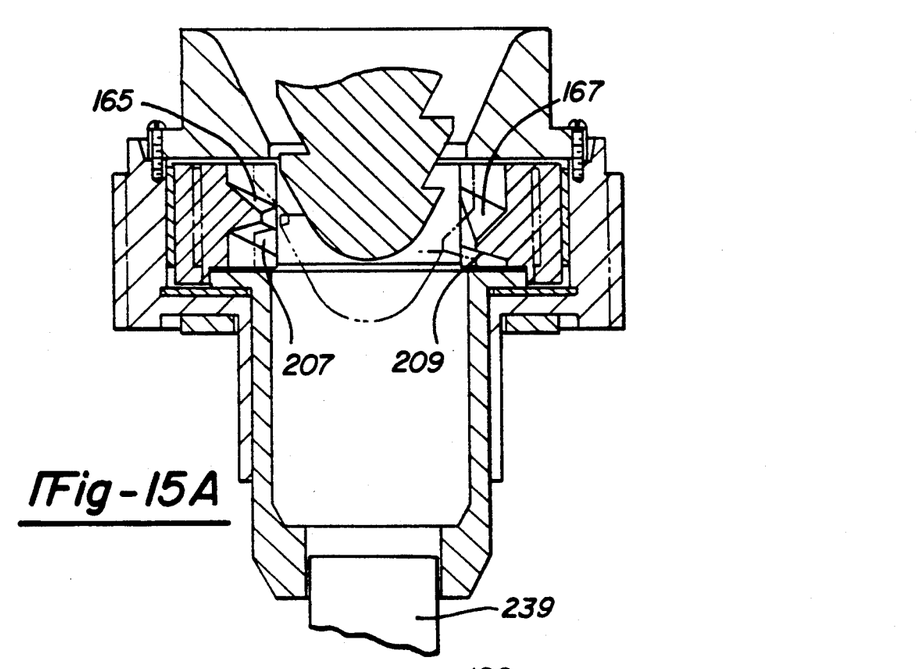
FIG. 15A is a cross-sectional view of the keeper assembly of the present invention showing manual insertion of the pin member.
Figure 15B:
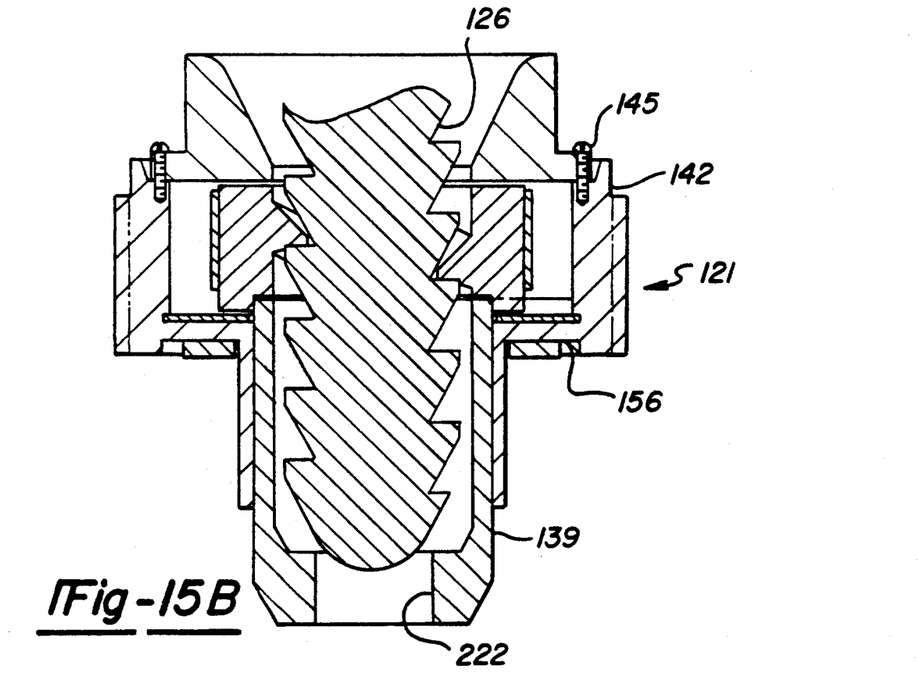
FIG. 15B is a view similar to that of FIG. 15A after the pin member has been fully inserted into the keeper member.

In the event of power failure, however, the pin member 120 can be manually inserted into the keeper member 121 without rotation thereof as shown in FIGS. 15A and 15B. When sufficient downward force is applied to overcome the tension on the spring band 129, the pawls 127, 128 are pushed outwardly by the shank 126 of the pin member 120 and move into the recesses 137, 138 in the cylinder 117, thus allowing the shank 126 to temporarily bypass the pawls 127, 128 inside the keeper member 121 and allowing the pin 120 to be fully engaged with the keeper member 121 without rotation of either the pin member 120 or the keeper member 121.

When manual force is applied to the pin 120 in an upward direction so as to attempt to remove it from the keeper 121, the force of the spring band keeps the pawls in contact with the pin member by pushing the pawls inwardly, and the lower surfaces 207, 209 of the ramp portions of the pawls are substantially flat. Since the upper edges of the threads 122 on the shank portion are also flat as shown in FIGS. 15A–15B, the spring 129 and pawls together provide a means for selectively retaining the pin member 120 in the keeper member 121 to prevent manual disengagement of the latching mechanism of the present invention until the motor 123 is energized by the switch 150 to turn in a second direction to rotatably and threadedly disengage the pin 120 from the keeper 121, or until a suitable tool is inserted into the geometric recess 222 and the cam driver tube 139 is manually rotated.

In the above described fashion, the keeper member 121 retentively engages the pin member 120 when the pin member 120 is manually inserted thereinto.

Figures 11, 12A, 16:
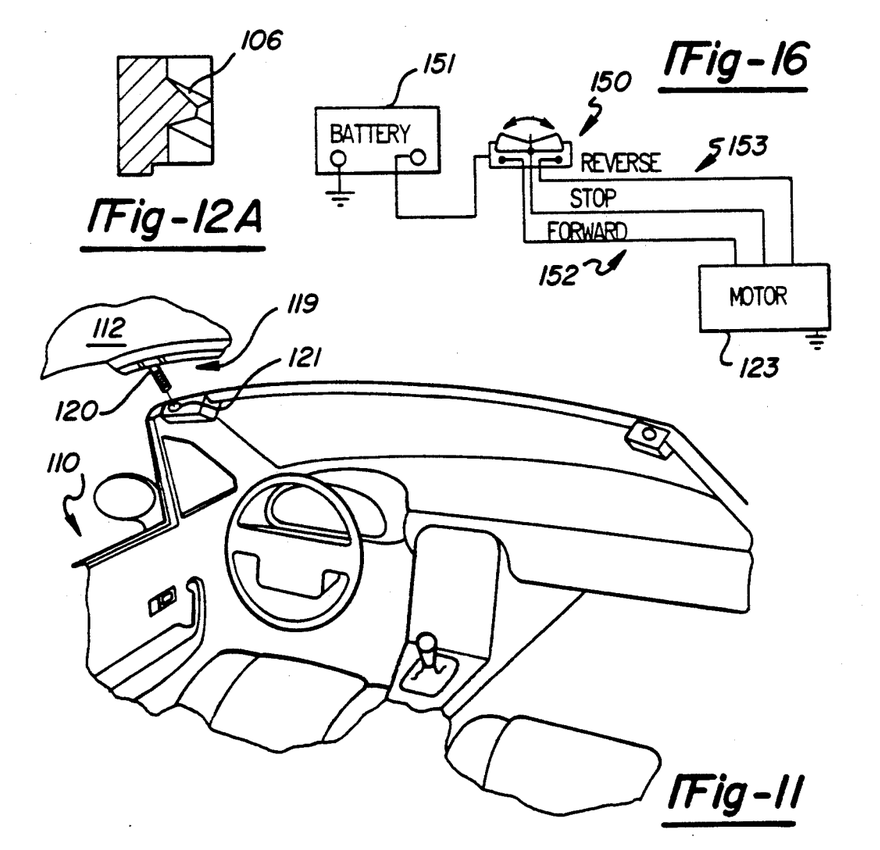
FIG. 11 is a perspective view, partially cut away, of a convertible-type vehicle incorporating a second embodiment of the power latch system hereof.
FIG. 12A is a cross-sectional view of one of the pawls, taken along the line 12A—12A of FIG. 12.
FIG. 16 is a schematic diagram of a circuit for operating the second embodiment of the present invention.

Referring particularly to FIGS. 13 and 16, the motor 123 and gears 140, 142, 148, and 149 together constitute a means for rotating the cylindrical body 117 of the keeper member 121 to urge engagement between it and the pin member 120. A battery 151 acts as a power source for energizing the means for rotating, and a switch 150 is included in the circuit for selectively connecting the power source to the means for rotating and for determining the direction of rotation of the keeper member 121, either by closing a forward circuit 152 which polarizes the motor 123 to actuate the means for rotating in a first direction and to rotatably and threadedly engage the pin member 120 in the keeper member 121, or alternatively, by closing a reverse circuit 153 which reverses the polarity to the motor 123 to actuate the means for rotating in a second direction and to rotatably and threadedly disengage the pin member 120 from the keeper member 121.

Although the present invention has been described herein with respect to specific embodiments hereof, it will be understood that the foregoing description is intended to be illustrative, and not restrictive. Many modifications of the present invention will occur to those skilled in the art, for example the keeper member could be held fixed and the pin member could be rotated. All such modifications which fall within the scope of the appended claims are intended to be within the scope and spirit of the present invention.

Having, thus, described the invention, what is claimed is:

1. A power latching mechanism comprising:
 (a) a pin member which comprises:
  (1) a base portion for mounting to a convertible top or other surface;
  (2) a shank portion which attaches to the base portion and depends therefrom, the shank portion having a plurality of recesses therein and having an enlarged end opposite the base portion;
  (3) a pluality of engaging members, one to fit in each recess of the shank portion, the recesses being trough-shaped and oriented parallel to the longitudinal axis of the shank portion and deeper at the ends thereof toward the base portion and shallower at the ends thereof toward the enlarged end to a maximum depth not exceeding the height of one of the engaging members;

(4) a retaining sleeve which fits over the shank portion, the sleeve having a plurality of apertures in the sides thereof corresponding to the recesses in the shank portion, the apertures sized slightly smaller than the engaging members so as to retain the engaging members from passing therethrough, the enlarged end of the shank portion acting as a stop to retain the sleeve on the shank portion; and (5) means for biasing the sleeve towards the enlarged end of the shank portion, keeping the engaging members in the shallow ends of the recesses and thereby biasing the engaging members outwardly;

(b) a keeper means having a body with a threaded cylindrical passageway formed therein for receiving the pin member;

(c) means for rotatably urging engagement between the pin member and the keeper member by rotating the keeper member; and (d) means for retentively engaging the pin member in the keeper member when the pin member is manually inserted into the keeper member without rotation of either member.

2. A power latching mechanism comprising:
(a) a pin member having a base portion for mounting to a vehicle surface and a substantially cylindrical shank portion which attaches to the base portion and extends therefrom, the shank portion being threaded on the outer surface thereof;
(b) a keeper member having a hollow cylindrical body which receives the pin member, the pin member and keeper member being rotatably and threadably interengagable with one another, said keeper member comprising:
 (1) a pair of opposed pawls, each of said pawls having:
  (i) a ramp portion which engages the threads of the pin member;
  (ii) a notch formed along a lower surface thereof which opens radially inwardly and downwardly; and
  (iii) a cam follower projection disposed in the notch;
 (2) means for biasing the pawls inwardly in the keeper member;
(c) means for rotating the cylindrical body of the keeper member to threadably engage the pin member with the keeper member;
(d) means for retaining the pin member in the keeper member, said means for retaining being defined by said opposed pawls and means for biasing; and
(e) manually operable means for moving the retaining means to allow disengagement of the pin member from the keeper member.

3. A power latching mechanism comprising:
(a) a pin member having a base portion for mounting to a vehicle surface and a substantially cylindrical shank portion which attaches to the base portion and extends therefrom, the shank portion being threaded on the outer surface thereof;
(b) a keeper member having a hollow cylindrical body which receives the pin member, the pin member and keeper member being rotatably and threadably interengageable with one another, the keeper member comprising:
 (1) a pair of opposed pawls, each of said pawls having:
  (i) a ramp portion which engages the threads of the pin member;
  (ii) a notch formed along a lower surface thereof which opens radially inwardly and downwardly; and
  (iii) a cam follower projection disposed in the notch;
 (2) means for biasing the pawls inwardly in the keeper member; and
 (3) a hollow cylindrical cam driver tube, the cam driver tube comprising a pair of radially outwardly projecting cams on an upper surface thereof and a geometric formation on a lower section thereof for engagement with a tool;
(c) means for rotating the cylindrical body of the keeper member to threadably engage the pin member with the keeper member;
(d) means for retaining the pin member in the keeper member, said means for retaining defined by said opposed pawls and means for biasing; and
(e) manually operable means for moving the retaining means to allow disengagement of the pin member from the keeper member, said pawls and cam driver tube defining said manually operable means for actuating the retaining means to allow disengagement of the pin member from the keeper member.

4. A power latching mechanism comprising:
(a) a pin member having a base portion for mounting to a vehicle surface and a substantially cylindrical shank portion which attaches to the base portion and extends therefrom, the shank portion being threaded on the outer surface thereof;
(b) a keeper member having a hollow cylindrical body which receives the pin member, the pin member and keeper member being rotatably and threadably interengagable with one another, the keeper member comprising:
 (1) a pair of opposed pawls, each of said pawls having:
  (i) a ramp portion which engages the threads of the pin member;
  (ii) a notch formed along a lower surface thereof which opens radially inwardly and downwardly; and
  (iii) a cam follower projection disposed in the notch;
 (2) means for biasing the pawls inwardly in the keeper member; and
 (3) a hollow cylindrical cam driver tube, the cam driver tube comprising a pair of radially outwardly projecting cams on an upper surface thereof and a geometric formation on a lower section thereof for engagement with a tool;
(c) means for rotating the cylindrical body of the keeper member to threadably engage the pin member with the keeper member;
(d) means for retaining the pin member in the keeper member, said means for retaining defined by said opposed pawls and means for biasing; and
(e) manually operable means for moving the retaining means to allow disengagement of the pin member from the keeper member, said pawls and cam driver tube defining said manually operable means for actuating the retaining means to allow disengagement of the pin member from the keeper member, wherein said engagement of the geometric formation and the tool causes the pawls to move radially outwardly to allow disengagement of the pawls from the pin member.

5. A power latching mechanism, comprising:
   (a) a pin member;
   (b) a keeper member having a hollow cylindrical body which receives the pin member, the pin member and keeper member being rotatably and threadably interengageable with one another;
   (c) means for rotating the cylindrical body of the keeper member to threadably engage the pin member with the keeper member;
   (d) means for retaining the pin member in the keeper member, said means for retaining including a plurality of engagement members which threadably engage said pin member and means for biasing said engagement members into engagement with said pin member; and
   (e) manually operable means for exerting an outward force on said engagement members to allow disengagement of the pin member from the keeper member without rotation of either the pin member or the keeper member body, said means for exerting being rotated to cause said engagement.

6. The mechanism of claim 5, wherein the pin member comprises:
   (a) a base portion for mounting to a vehicle surface; and
   (b) a substantially cylindrical shank portion which attaches to the base portion and extends therefrom.

7. The mechanism of claim 6 wherein said shank portion of said pin member is threaded on the outer surface thereof and the keeper member comprises:
   (a) a pair of opposed pawls, each of said pawls having a ramp portion which engages the threads of the pin member; and
   (b) means for biasing the pawls inwardly in the keeper member;
   said opposed pawls and means for biasing also defining said means for retaining the pin member in the keeper member.

* * * * *